US012539989B2

(12) United States Patent
Evers (10) Patent No.: US 12,539,989 B2
(45) Date of Patent: Feb. 3, 2026

(54) PACKAGING MACHINE FOR PACKAGING PRODUCTS IN CARTONS AND METHOD FOR THIS

(71) Applicant: ILLINOIS TOOL WORKS INC., Glenview, IL (US)

(72) Inventor: Jürgen Evers, Spelle (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 273 days.

(21) Appl. No.: 17/607,324

(22) PCT Filed: May 18, 2020

(86) PCT No.: PCT/US2020/033405
§ 371 (c)(1),
(2) Date: Oct. 28, 2021

(87) PCT Pub. No.: WO2020/236714
PCT Pub. Date: Nov. 26, 2020

(65) Prior Publication Data
US 2022/0204195 A1    Jun. 30, 2022

(30) Foreign Application Priority Data

May 17, 2019    (DE) .................... 10 2019 113 105.7

(51) Int. Cl.
*B65B 5/02*        (2006.01)
*B65B 5/06*        (2006.01)
(Continued)

(52) U.S. Cl.
CPC .............. *B65B 5/024* (2013.01); *B65B 5/06* (2013.01); *B65B 7/20* (2013.01); *B65B 35/50* (2013.01);
(Continued)

(58) Field of Classification Search
CPC .. B65B 5/024; B65B 5/06; B65B 7/20; B65B 35/50; B65B 43/126; B65B 43/145; B65B 43/265; B65B 65/003
See application file for complete search history.

(56) References Cited

U.S. PATENT DOCUMENTS 3,570,209 A * 3/1971 Salwasser ............... B65B 35/52
                                                     53/496
3,605,377 A * 9/1971 Sabel ........................ B65B 5/06
                                                     53/284
(Continued)

FOREIGN PATENT DOCUMENTS

CN         1238295        12/1999
CN       104773333 A       7/2015
(Continued)

OTHER PUBLICATIONS

European Patent Office (EPO), Rijswijk, NL, International Search Report, Form PCT/ISA/210 for International Application No. PCT/US2020/033408, Sep. 4, 2020 (3 pp.).
(Continued)

*Primary Examiner* — Thomas M Wittenschlaeger
*Assistant Examiner* — Katie L Gerth
(74) *Attorney, Agent, or Firm* — Pauley Erickson & Swanson (57) ABSTRACT

The invention relates to a packaging machine (100) for packaging products (O) in cartons (K), wherein the packaging machine (100) has the following: a product feed (110) for feeding products (O) to be packaged in cartons (K); a carton magazine (120) in which a plurality of preferably glued carton blanks are arranged collapsed at least substantially flat; and a preferably stationary erecting station (130) for erecting carton blanks to form at least substantially block-shaped open cartons (K), wherein the product feed (110) has an at least substantially horizontal first conveying (Continued)

direction, wherein the erecting station (130) is positioned next to the carton magazine (120) in an at least substantially horizontal transverse direction perpendicular to the first conveying direction, and wherein the erecting station (130) is embodied so that it is stationary at least in the horizontal transverse direction.

11 Claims, 5 Drawing Sheets (51) Int. Cl.
*B65B 7/20* (2006.01)
*B65B 35/50* (2006.01)
*B65B 43/12* (2006.01)
*B65B 43/14* (2006.01)
*B65B 43/26* (2006.01)
*B65B 65/00* (2006.01)
*B65G 61/00* (2006.01)

(52) U.S. Cl.
CPC .......... *B65B 43/126* (2013.01); *B65B 43/145* (2013.01); *B65B 43/265* (2013.01); *B65B 65/003* (2013.01); *B65G 61/00* (2013.01)

(56) References Cited

U.S. PATENT DOCUMENTS

| | | | | |
|---|---|---|---|---|
| 3,613,526 | A * | 10/1971 | Jones | B31B 50/80 53/566 |
| 3,751,872 | A * | 8/1973 | Helms | B65B 21/242 53/458 |
| 3,941,037 | A * | 3/1976 | Reichert | B65B 35/50 493/449 |
| 3,952,635 | A * | 4/1976 | Mims | B31B 50/00 271/31.1 |
| 4,059,477 | A * | 11/1977 | Wesley | B65C 1/04 156/212 |
| 4,951,445 | A * | 8/1990 | Thibault | B25J 15/0052 53/251 |
| 4,976,584 | A * | 12/1990 | Focke | B65G 61/00 414/789.6 |
| 5,626,002 | A * | 5/1997 | Ford | B65B 21/242 53/48.7 |
| 5,673,536 | A * | 10/1997 | Easter | B65B 49/12 53/48.8 |
| 5,689,931 | A * | 11/1997 | Bridges | B65B 43/285 53/64 |
| 6,290,448 | B1 * | 9/2001 | Focke | B65G 57/005 198/374 |
| 6,383,123 | B1 * | 5/2002 | Ehring | B65G 47/848 493/52 |
| 8,015,782 | B2 * | 9/2011 | Borderi | B65B 59/001 53/566 |
| 10,556,713 | B2 * | 2/2020 | Langen | B65G 57/22 |
| 11,752,723 | B2 * | 9/2023 | Langen | B65B 59/00 493/313 |
| 2002/0028737 | A1 * | 3/2002 | Ruf | B65H 3/0808 493/309 |
| 2006/0042188 | A1 * | 3/2006 | Ford | B65B 21/06 53/48.8 |
| 2008/0190075 | A1 * | 8/2008 | Waeckerlin | B65B 65/003 53/273 |
| 2008/0229708 | A1 * | 9/2008 | Schulte | B65G 61/00 414/788.1 |
| 2010/0178149 | A1 * | 7/2010 | Fritzsche | B65G 57/22 414/789.5 |
| 2011/0005174 | A1 * | 1/2011 | Prahm | B65B 5/061 901/50 |
| 2013/0000252 | A1 * | 1/2013 | Pettersson | B65B 5/024 348/46 |
| 2017/0043986 | A1 * | 2/2017 | Ducharme | B65G 57/00 |
| 2018/0273227 | A1 * | 9/2018 | Ushidate | B65B 53/00 |
| 2022/0204288 | A1 * | 6/2022 | Wöhle | B65B 35/50 |
| 2022/0227512 | A1 * | 7/2022 | Schürkamp | B65B 35/50 |

FOREIGN PATENT DOCUMENTS

| | | |
|---|---|---|
| CN | 105522754 | 4/2016 |
| EP | 0 825 111 A1 | 2/1998 |
| EP | 0 949 169 A1 | 10/1999 |
| EP | 1 067 050 A2 | 1/2001 |
| EP | 1 231 170 A1 | 8/2002 |
| EP | 1 718 549 | 11/2006 |
| EP | 3 227 189 | 10/2017 |
| JP | H07 257502 A | 10/1995 |
| JP | 2004-203621 A | 7/2004 |
| WO | WO 2005/080239 A1 | 9/2005 |
| WO | WO 2016/087760 A1 | 6/2016 |
| WO | WO 2019/048219 | 3/2019 |

OTHER PUBLICATIONS

European Patent Office (EPO), Rijswijk, NL, Written Opinion of the Int'l Searching Authority for Int'l Appln No. PCT/US2020/033408, Form PCT/ISA/237, Sep. 4, 2020 (6 pp.).

European Patent Office (EPO), Rijswijk, NL, International Search Report, Form PCT/ISA/210 for International Application No. PCT/US2020/033405, Sep. 17, 2020 (3 pp.).

European Patent Office (EPO), Rijswijk, NL, Written Opinion of the Int'l Searching Authority for Int'l Appln No. PCT/US2020/033405, Form PCT/ISA/237, Sep. 17, 2020 (8 pp.).

* cited by examiner

PACKAGING MACHINE FOR PACKAGING PRODUCTS IN CARTONS AND METHOD FOR THIS

CROSS REFERENCE TO RELATED APPLICATION

This application is a National Phase filing of PCT International Patent Application PCT/US2020/033405, filed on 18 May 2020, which claims the priority of German Patent Applications DE 10 2019 113 105.7, filed 17 May 2019.

These applications are hereby incorporated by reference herein in their entirety and is made a part hereof, including but not limited to those portions which specifically appear hereinafter.

The invention relates generally to a packaging machine. In particular, the invention relates to a packaging machine for packaging products in cartons and a method for this.

Packaging machines for packaging products in cartons are already known. For example, packaging machines are used for packaging pharmaceutical products that are already packaged in folding boxes. In the production of pharmaceutical products as a whole, there is an ongoing space problem, which necessitates the use of space-saving machines even when it comes to packaging machines. In order to achieve an economic operation of the machine, particularly in connection with pharmaceutical products, it is also necessary for it to have a high throughput (despite the space-saving design).

It has not yet been possible to satisfactorily achieve the above-mentioned aspects in the prior art.

The object underlying the invention, therefore, is to disclose a packaging machine, which eliminates the above-mentioned problems of the prior art. The object of the present invention in particular is to disclose a packaging machine in which a space-saving design and a high throughput can be achieved.

One solution according to the invention consists of designing a packaging machine for packaging products in cartons, the packaging machine having the following: a product feed for feeding products to be packaged in cartons; a carton magazine in which a plurality of preferably glued carton blanks are arranged collapsed at least substantially flat; and a preferably stationary erecting station for erecting carton blanks to form at least substantially block-shaped open cartons, the product feed having an at least substantially horizontal first conveying direction, the erecting station being positioned next to the carton magazine in an at least substantially horizontal transverse direction perpendicular to the first conveying direction, and the erecting station being formed so that it is stationary at least in the horizontal transverse direction.

The object is attained in a satisfactory way by the packaging machine according to the invention.

The above-described packaging machine is in particular (but not exclusively) a so-called secondary packaging machine that is embodied to produce packages, in particular large packages, namely in that products, in particular articles already packaged in folding boxes, are dispensed into cartons.

In this connection, "horizontal" is understood to be a direction that extends parallel to the plane in which the packaging machine is positioned. A "vertical" direction is correspondingly understood to mean the "height direction" of the packaging machine. For example in a packaging machine, the horizontal first conveying direction is the longitudinal direction of the packaging machine.

In this connection, the expression "at least substantially horizontal" is also intended to cover directions that do not extend precisely horizontal. Instead, the horizontal first conveying direction can have inclinations of up to 30° at least in some places. The expression "at least substantially horizontal" thus includes deviations of up to 30° from the actually horizontal direction.

In the carton magazine, the carton blanks are upright next to one another, preferably arranged collapsed at least substantially flat. In other words, they are lined up one after another in the first conveying direction. In order to feed a carton blank to the erecting station, the (front) carton blank is taken, for example by means of a (suction) gripper, from the carton magazine straight to the erecting station (in the horizontal transverse direction). The carton can be erected by means of another gripper.

Because the carton blanks are glued, they only have to be pulled on two sides in order to be erected, thus enabling the formation of the substantially block-shaped open cartons.

The products are preferably rectangular. For example, the products are folding boxes containing, also for example, pharmaceutical products.

A stationary erecting station is understood to be one in which the (collapsed) carton is not moved, for example by means of a conveyor belt or the like, from one station to another station. In the stationary erecting station, therefore, the entire erecting process for forming the substantially block-shaped open carton takes place in one station or position. Naturally, the carton itself has to be moved (for example by means of grippers) in order to be erected.

Correspondingly, an erecting station, which is stationary at least in the horizontal transverse direction, means that in it, no movement of the carton from one station to another station in the horizontal transverse direction takes place during the erecting process. An erecting station that is stationary overall is stationary in both directions, i.e. stationary in the horizontal transverse direction and stationary in the horizontal first conveying direction.

The carton blanks are only erected once they have been moved, as described above by way of example, from the carton magazine to the erecting station. Thus the carton blank is first transported from the carton magazine to the erecting station in the horizontal transverse direction and then the carton blank is erected.

The considerable advantage of the above-described packaging machine particularly consists of the fact that the design permits a particularly short construction (in the longitudinal direction of the packaging machine and in the first conveying direction). The carton magazine is thus usually positioned so that the feeding of the carton blanks is likewise carried out in the horizontal first conveying direction. Because in the packaging machine according to the invention, the carton magazine feeds the carton blanks in the horizontal transverse direction, the packaging machine can be shortened by at least the length of the carton magazine. In addition, the stationary erecting station also makes it possible to correspondingly reduce the length and width of the packaging machine.

According to an advantageous modification of the invention, the carton magazine is positioned above the product feed in such a way that the product feed guides the products through under the carton magazine.

Alternative to this, it would also be possible to position the carton magazine under the product feed.

According to an advantageous modification of the invention, the erecting station is embodied to erect the carton blanks at a height in the first conveying direction at which the carton magazine is also positioned.

In this connection, as already mentioned above, the first conveying direction is also the longitudinal direction of the packaging machine.

According to an advantageous modification of the invention, the packaging machine also has an operating side, the carton magazine being positioned on the operating side and the erecting station being positioned behind the carton magazine, away from the operating side.

In particular, the operating side preferably extends along the product feed. Because the carton magazine is positioned above the product feed, both the product feed and the carton magazine can be operated from the operating side. As a result, regions of the packaging machine that require frequent intervention by the operator (for example filling the carton magazine) are easily accessible.

From the operating side, i.e. from the operator's point of view, the erecting station is positioned behind the carton magazine. In other words, viewed from the operating side, the erecting station is hidden behind the carton magazine.

For example, the operating side can feature the fact that it has a control panel or comparable control element.

According to an advantageous modification of the invention, the product feed has a stacking apparatus that is embodied to at least stack a first group of products vertically above or below a second group of products.

According to an advantageous modification of the invention, the stacking apparatus is also embodied to convey the stacked groups of products from a lower level to a vertically higher upper level.

Naturally, depending on the embodiment, a conveying from an upper level to a lower level can also be performed. The stacking apparatus thus generally also serves to overcome the height difference between the inlet of the product feed and the carton magazine.

According to an advantageous modification of the invention, the products are fed to the stacking apparatus in the first conveying direction and conveyed onward from the stacking apparatus in a second conveying direction, the second conveying direction being at least substantially opposite from the first conveying direction.

In this connection, the conveying in the first conveying direction is preferably performed by means of a conveyor belt whereas the conveying in the second conveying direction is preferably performed by means of a slide (product feeding slide). In particular, this is because the products conveyed in the first conveying direction are not stacked, whereas the products conveyed in the second conveying direction have already been stacked.

This also means that the stacking apparatus is positioned at a longitudinal end of the product feed opposite from the product inlet of the product feed (in the first conveying direction). The directional change of the conveying direction in this case makes it possible to achieve a short design (in the longitudinal direction) of the packaging machine.

According to an advantageous modification of the invention, the packaging machine also has a carton packing station for packing the cartons with products, the carton packing station being positioned downstream in the first conveying direction next to the erecting station.

In this case, the carton packing station is positioned at a height in the first conveying direction at which an end of the product feed and a product slot are respectively positioned.

According to an advantageous modification of the invention, a product slot is positioned at the end of the product feed, at which product slot a group of products to be packaged is collected, wherein a slide is positioned at the product slot, which slide is embodied to slide the group of products to be packaged in an at least substantially horizontal sliding direction into a carton at the carton packing station, the sliding direction being at least substantially perpendicular to the first conveying direction.

Here, too, the placement and embodiment of the individual stations achieve an extremely short design.

According to an advantageous modification of the invention, the packaging machine also has a labeling apparatus which is embodied to provide a carton with a label, preferably from below.

The labeling apparatus preferably has a magazine and a labeling guide, with a label being transported from the magazine to the labeling guide. For this purpose a label transporting apparatus, for example, can be provided, which connects the magazine to the labeling guide.

The labeling apparatus is embodied so that it is positioned (at least substantially) under the carton that is "traveling past." In this connection, the labeling guide reaches into the transport path of the carton in such a way that a label can be glued to the carton. The labeling apparatus here—or more precisely stated, the labeling guide is positioned so that a label can be applied to the front, the end surface, and/or the underside of the carton. In other words, depending on the positioning of the labeling guide, it is possible to apply a label on the front, the underside, or around a corner (front to underside) on the carton. The sides of the carton in this case refer to the transport direction, i.e. the front is toward the front in the transport direction and the underside is at the bottom in the transport direction.

According to an advantageous modification of the invention, the packaging machine also has a carton conveying apparatus that is embodied to transport cartons from the erecting station to the carton packing station and from the carton packing station to a carton closing station at which an open carton is folded and/or glued to form a closed carton, the conveying direction of the carton conveying apparatus extending in the direction of the first conveying direction.

Viewed in the conveying direction, therefore, the erecting station is positioned upstream of the carton packing station, which is in turn positioned upstream of the carton closing station.

According to an advantageous modification of the invention, the labeling apparatus is positioned at least substantially below the carton conveying apparatus.

The conveying motion of the carton conveying apparatus is in particular also required for the labeling. In other words, the labeling apparatus or more precisely, the labeling guide itself is stationary and the relative motion between the carton and the guide, which motion is required for the labeling, is carried out by means of the conveying motion of the carton conveying apparatus.

Preferably, the labeling apparatus can be positioned together with a carton turning station that is embodied to turn cartons.

According to an advantageous modification of the invention, the packaging machine also has the following: a palletizing station that has a platform and a Scara robot, which is positioned on the platform and which is embodied to move cartons to be stowed on pallets; and a pallet feed that is embodied to feed empty pallets along a path, the platform being embodied in a bridge-like manner and the path extending through under the platform of the palletizing station.

The packaging machine is thus not only a secondary packaging machine, but also packages the cartons onto pallets. The packaging machine is thus in particular a combination machine, which is suitable for packaging and palletizing.

According to an advantageous modification of the invention, the platform serves as an intermediate store for cartons to be stowed on pallets.

The object of the invention is also attained by means of a method for packaging products in cartons with the aid of one of the above-mentioned packaging machines.

The method for packaging products can also attain the object in a satisfactory way. In particular, all aspects and advantages that ensue from the corresponding packaging machines apply here as well.

Another solution according to the invention consists in a packaging machine for positioning elements, preferably cartons, on pallets, the packaging machine having the following: a palletizing station that has a platform and a Scara robot, which is positioned on the platform and which is embodied to move cartons to be stowed on pallets; and a pallet feed that is embodied to feed empty pallets along a path, the platform being embodied in a bridge-like manner and the path extending through under the platform of the palletizing station to a pallet loading station.

The packaging machine according to the invention attains the object in a satisfactory way. In particular, the above-described packaging machine is space-saving in that the pallet feed is positioned under the platform. In this case, it is possible for empty pallets to be placed under the platform, for example by means of pallet trucks, forklifts, or other transport vehicles. The empty pallets are then transported from the pallet feed to the pallet loading station in which the pallets are loaded by means of the Scara robot.

Once a pallet has been fully loaded, it can be kept at the pallet loading station until it is picked up by means of a pallet truck, forklift, or other transport vehicle. The pallet feed is thus at least semiautomatic.

According to an advantageous modification of the invention, the platform serves as an intermediate store for elements to be stowed on pallets.

In this case, the platform particularly serves as an intermediate buffer during a pallet change. In other words, the Scara robot continues to receive elements to be stowed on pallets even during the pallet change. But the Scara robot no longer moves these elements directly onto a pallet, instead temporarily storing them at the palletizing station or more precisely, on the platform. As a result, the preceding machines or stations can continue to operate at their own cycle rhythm and the throughput is not negatively affected.

Once the pallet feed has fed the new (empty) pallet to the pallet loading station, the elements to be stowed, which have been temporarily stored on the platform, can be loaded onto the pallets.

According to an advantageous modification of the invention, the area of the platform is greater than the area of a pallet.

In this connection, preferably the length and width of the platform are slightly greater than the length and width of the pallet so that a pallet can be positioned entirely under the platform. This enables an extremely compact design of the palletizing station.

According to an advantageous modification, the Scara robot has a main body, an upper arm, and a lower arm, the upper arm being fastened to the main body so that it can be rotated around a first axis of rotation and the lower arm being fastened to the upper arm so that it can be rotated around a second axis of rotation that extends parallel to the first axis of rotation, the Scara robot also having a control that is embodied so that it permits the lower arm to cross the upper arm.

The upper arm itself can be moved vertically relative to the main body. The first and second axes of rotation are located at opposite ends of the upper arm. Preferably, the Scara robot also has an additional, third axis of rotation on the lower arm (at an end opposite from the second axis of rotation), at which a grasping unit (hand) for grasping the elements (cartons) is positioned.

The Scara robot is thus able to move vertically and has a broad and variable radius of action. The embodiment with an upper and lower arm particularly makes it possible to also set down elements very close to the main body or more precisely, on the base of the Scara robot. This enables optimal use of the available space.

The particular control, which is embodied so that it enables the lower arm to cross the upper arm, expands the movement possibilities of the robot. In this context, "crossing" is understood to mean that the lower arm passes underneath the upper arm; the lower arm thus travels through under the upper arm. This aspect, in particular, is a distinctive feature of the control or actuation of the Scara robot according to the invention.

According to an advantageous modification of the invention, the pallets are loaded, preferably automatically, onto the pallet feed by means of forklift trucks and unloaded by the pallet loading station.

In other words, the pallet feeding operations can be performed not only in semiautomatic fashion, but also in fully automatic fashion; with fully automatic execution, automatic forklift trucks bring the empty pallets and take away full pallets.

According to an advantageous modification of the invention, the packaging machine also has an upstream labeling apparatus that is embodied to provide the elements with a label, preferably from below.

According to an advantageous modification of the invention, the elements are cartons and the packaging machine also has an upstream carton closing station at which an open carton is folded and/or glued to form a closed carton.

According to an advantageous modification of the invention, the labeling apparatus is positioned together with a carton turning station that is embodied to turn cartons.

At the carton turning station, the cartons can be turned so that the label can be subsequently placed onto a desired side, e.g. so that it is readable on the pallet.

According to an advantageous modification, the labeling apparatus is positioned at least substantially below the carton closing station and/or below the carton turning station.

According to an advantageous modification, the packaging machine has the following upstream of the palletizing station: a product feed for packaging products in cartons, wherein the packaging machine has the following: a product feed for feeding products to be packaged in cartons; a carton magazine in which a plurality of preferably glued carton blanks are arranged collapsed at least substantially flat; and a preferably stationary erecting station for erecting carton blanks to form at least substantially block-shaped open cartons, the product feed having an at least substantially horizontal first conveying direction, the erecting station being positioned next to the carton magazine in an at least substantially horizontal transverse direction perpendicular to the first conveying direction, and the erecting station being formed so that it is stationary at least in the horizontal transverse direction.

All of the aspects, which have already been mentioned with regard to the product feed, the carton magazine, and the erecting station, apply here as well.

According to an advantageous modification of the invention, the carton magazine is positioned above or below the product feed in such a way that the product feed guides the products through under the carton magazine.

According to an advantageous modification of the invention, the product feed has a stacking apparatus that is embodied to at least stack a first group of products vertically above or below a second group of products.

According to an advantageous modification of the invention, the stacking apparatus is also embodied to convey the stacked groups of products from a lower level to a vertically higher upper level, the products being fed to the stacking apparatus in the first conveying direction and conveyed onward from the stacking apparatus in a second conveying direction, the second conveying direction being at least substantially opposite from the first conveying direction.

The solution according to the invention also consists in disclosing a method for placing elements, preferably cartons, onto pallets, namely with the aid of one of the above-mentioned packaging machines. Correspondingly, the above-mentioned aspects and advantages relating to the respective packaging machines apply here as well.

According to an advantageous modification of the invention, the method also has the following step: actuation of the Scara robot in such a way that the lower arm crosses the upper arm. This actuation particularly expands the movement possibilities of the Scara robot.

One solution according to the invention also consists in disclosing a packaging machine for packaging products in cartons, the packaging machine having a product feed for feeding products to be packaged in cartons, the products having the length P, the product feed having a stacking apparatus, which is embodied to at least stack a first group of products, which are positioned next to one another in a row with a length R, vertically above or below a second group of products, which are likewise positioned next to one another in a row with a length R, the length R being a multiple of the length P, a product slot being positioned at the end of the product feed at which product slot stacked rows of products with the length R are collected, a slide with a length S being positioned at the product slot, which slide is embodied to slide the stacked rows of products having a length that at least corresponds to the length S in an at least substantially horizontal sliding direction into a carton at the carton packing station, the length S being shorter than the length R by at least one times the length P.

The packaging machine according to the invention attains the object in a satisfactory way. In particular, the above-described packaging machine ensures that the throughput of the packaging machine can be increased despite the latter's short design, for example, and can be kept at a high level.

The length P of the product, the product preferably being a folded cardboard box, is the length of the product in the (first) conveying direction of the product feed when the product is positioned on the product feed. This therefore corresponds to the length of the product from front to back in the transport direction. It follows from this that the length R is also a multiple of the length P since the row with the length R is composed of a plurality of products with the length P. The number of products that are positioned in a row in this case depends, for example, on the product length and the carton size.

The length S of the slide extends perpendicular to the sliding direction of the slide. In other words, the length S indicates and predetermines the maximum length of the row of products that can be conveyed into a carton with one sliding procedure. The height of the slide in turn indicates and predetermines the maximum height of the rows of products that are stacked on top of one another. The slide, as a whole, therefore indicates the maximum number of products that can be conveyed into a carton with one sliding procedure.

The fact that length S of the slide only at least substantially corresponds to the length of the rows of products stacked on top of one another that can be conveyed into the carton with one sliding procedure is due to the fact that the length S of the slide is preferably embodied as slightly smaller in order to fit into the carton, as will be explained in greater detail below.

The length S is shorter than the length R by at least one times the length P. In other words, when the products are slid in, at least one product stack remains behind as a "left-over stack" that is not slid into the carton in this sliding procedure. If the length S is shorter than the length R by two times the length P, then two remaining stacks of products correspondingly remain behind.

In the above-described packaging machine, the stacking apparatus constitutes the bottleneck in the production process. In other words, the stacking apparatus predetermines the overall cycle rhythm of the packaging machine. It is thus desirable for the stacking apparatus to always convey the maximum stackable quantity (i.e. length R) of products. The length R thus corresponds to the maximum stacker length or more precisely, the maximum row length of products to be stacked.

Because a larger quantity of products travels through the stacking apparatus in one cycle than can subsequently be packed into the carton with a single sliding procedure, a buffer can be built up before the product slot, which contributes to accelerating the overall throughput of the packaging machine. In other words, the "slow" stacking time of the stacking apparatus cannot have as powerful an effect on the cycle time of the packaging machine.

According to an advantageous modification of the invention, the product slot has a frontal area serving as a buffer zone, the frontal area having a length V that at least corresponds to the length P.

This means that at least one stack of products can be stored in the frontal area. It goes without saying that several stacks of products (for example two or three stacks) can preferably be stored next to one another in the frontal area.

According to an advantageous modification of the invention, the length S during operation of the packaging machine corresponds at most, preferably at least substantially, to the length of a carton to be packed.

In this context, the expression "preferably at least substantially" as applied to the length of the carton to be packed means that the length S is preferably slightly less than the length of the carton. This makes sense in particular because the slide must travel into the carton. For example, the slide is 10 mm smaller than the carton on each side.

According to an advantageous modification of the invention, the length S is adjustable at least before operation of the packaging machine and can be adapted to the length of the carton to be packed.

The packaging machine can therefore be used to pack several formats of cartons. For example, it is conceivable in this context for the slide to be changed and replaced with a slide of a different length S (or a different height).

According to an advantageous modification of the invention, the maximum adjustable length $S_{max}$ of the slide, which indicates the maximum row length of products that can be inserted, is between 400 mm and 800 mm, preferably between 500 mm and 700 mm, particularly preferably about 600 mm.

According to an advantageous modification of the invention, the length V of the frontal area at least substantially corresponds to half the maximum adjustable length $S_{max}$ of the slide; it is particularly preferable for the length V of the frontal area to be 300 mm.

According to an advantageous modification of the invention, the packaging machine also has an incorrect part discharge that is embodied to discharge products that should not be packed before they are grouped in the stacking apparatus.

In this connection, products that should not be packed can be flawed products of the type to be packed and/or flawless products of a type that should not be packed. The incorrect part discharge therefore makes sure that such products are not packed in cartons.

According to an advantageous modification of the invention, the product feed has an at least substantially horizontal first conveying direction, with the incorrect part discharge being positioned downstream of the stacking apparatus in the first conveying direction, preferably next to the stacking apparatus. In other words, incorrect parts are separated out downstream of the stacking apparatus, viewed in the first conveying direction.

According to an advantageous modification of the invention, the products are fed to the stacking apparatus in the first conveying direction and conveyed onward from the stacking apparatus in a second conveying direction, the second conveying direction being at least substantially opposite from the first conveying direction.

According to an advantageous modification of the invention, the packaging machine has a preferably optical monitoring device (such as a camera) that is embodied to detect whether a product is a product that should not be packed, the packaging machine also being embodied, when the monitoring device detects a product that should not be packed, to trigger the incorrect part discharge so that it discharges the product that should not be packed. For this purpose, the incorrect part discharge also has a collecting container in which the products that should not be packed are collected.

According to an advantageous modification of the invention, the monitoring device is positioned upstream of the stacking apparatus in the first conveying direction, preferably next to the stacking apparatus.

The monitoring device is thus positioned before the stacking apparatus while the incorrect part discharge is positioned after the stacking apparatus. This positioning in particular allows for the time required to process the signals picked up by the monitoring device (for example, images in the case of a camera).

According to an advantageous modification of the invention, the stacking apparatus is also embodied to convey the stacked groups of products from a lower level to a vertically higher upper level.

One solution according to the invention also consists in disclosing a method for packaging products in cartons, namely with the aid of one of the above-mentioned packaging machines. Correspondingly, the object can also be attained in a satisfactory way by the method, with the individual aspects of the packaging machines being applicable to the method.

BRIEF DESCRIPTION OF THE DRAWINGS

The invention will be explained in greater detail below based on the description of exemplary embodiments with reference to the accompanying drawings wherein.

DETAILED DESCRIPTION OF THE INVENTION

In the following, reference is first made to FIG. 1 in order to give an overview of the packaging machine 100 according to the invention.

The packaging machine 100 is used to package products O in cartons K and to then stack them on pallets Z. For this purpose, the packaging machine 100 has a product feed 110 at its inlet. The product feed 110 is used to feed products O to the packaging machine 100. The products O can, for example, be folding boxes. The products O are moved along a first at least substantially horizontal conveying direction. This is the longitudinal direction of the packaging machine 100 shown in the figures. In FIG. 1, the conveying direction is from left to right. In this case, the product inlet is positioned at one end of the packaging machine 100 (on the left side in FIG. 1). A stacking apparatus 111 is positioned on the other side of the product feed 110 (on the right side in FIG. 1).

The stacking apparatus 111 stacks a first group of products O vertically above a second group of products. The groups of products O are each positioned in a row with the length R. In the example shown here, four products O, each with the length P, are positioned in a row with the length R. The length R here thus corresponds to four times the length P. In this example, the stacking apparatus 111 stacks seven groups of products O on top of one another.

Figure 1:
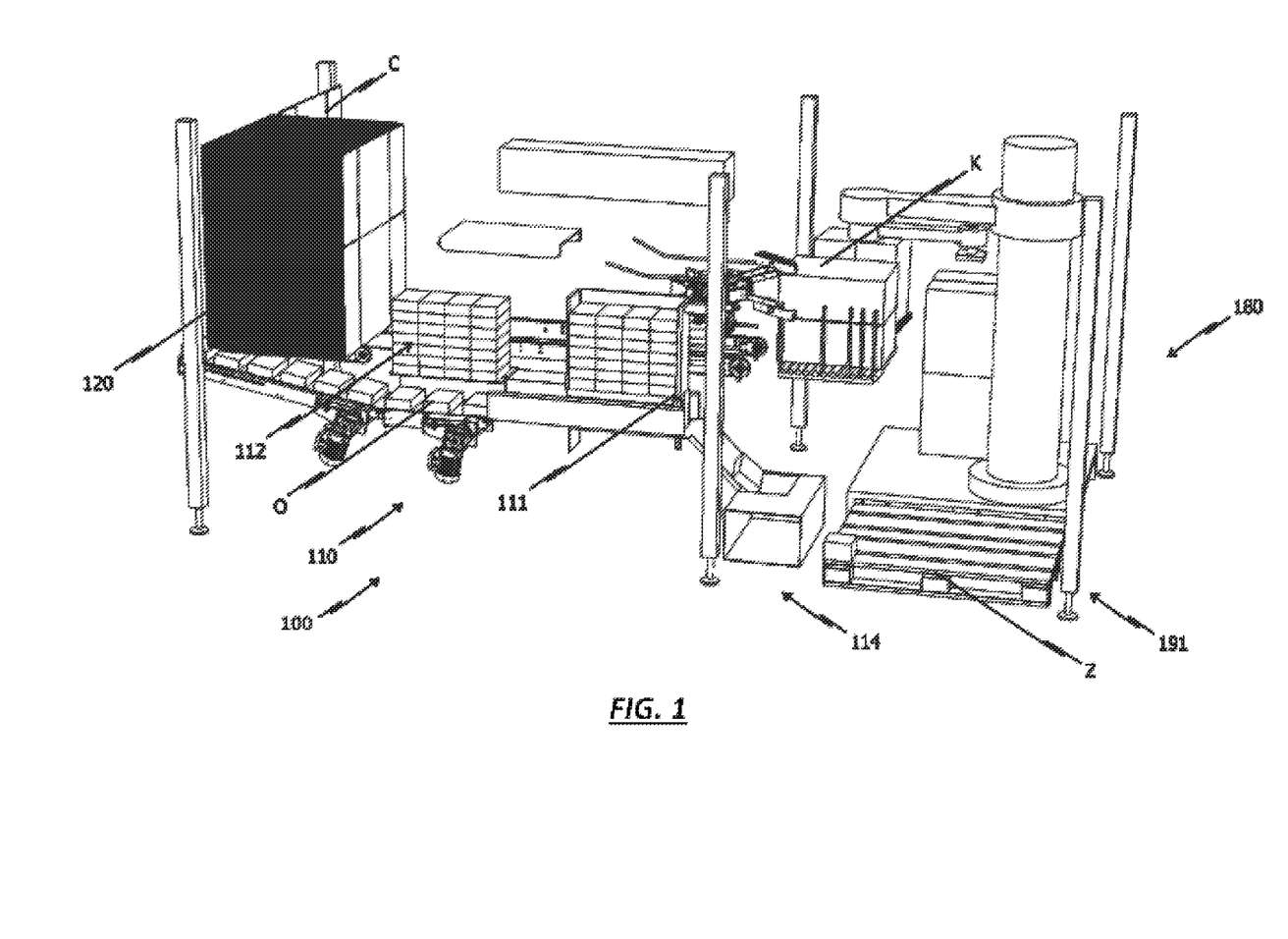
FIG. 1 shows a schematic top view of a packaging machine according to the present invention from the operating side.

In FIG. 1, on the right (i.e. downstream in the first conveying direction) next to the stacking apparatus 111, an incorrect part discharge 114 is provided. These are used to discharge products, which should not be packed, from the packaging process.

At the stacking apparatus 111, there is a change in the conveying direction of the products O. Starting from this point in FIG. 1, the products O are fed from right to left and thus in a second conveying direction opposite from the first conveying direction. In particular, the products are conveyed to a product slot 112.

Further, in the second conveying direction, next to the product slot 112, a carton magazine 120 is provided in which carton blanks C are stored collapsed flat. In an at least substantially horizontal transverse direction perpendicular to the first (and also the second) conveying direction next to the carton magazine 120, an erecting station 130 is provided at which the carton blanks C can be erected. Downstream of the erecting station 130 in the first conveying direction, there is a carton packing station 140 at which the erected cartons K can be packed.

The packing is carried out from the product slot 112, namely in an at least substantially horizontal sliding direction, into a carton K that is positioned in the carton packing station 140. The sliding direction here is perpendicular to the first (and also the second) conveying direction and thus parallel to the transverse direction.

FIG. 1 shows the packaging machine 100 from an operating side from which the packaging machine 100 can be operated. This also means that the product feed 110 extends along the operating side (from left to right). The carton magazine 120 and the incorrect part discharge 114 are likewise positioned on the operating side. In particular, the product feed 110 extends under the carton magazine 120. The stacked products O also travel along the operating side, from which they are then slid away at the product slot 112.

This also means that the erecting station 130 and the carton packing station 140 are not positioned toward the operating side. Instead, viewed from the operating side, the erecting station 130 is hidden behind the carton magazine 120 and the carton packing station 140 is hidden behind the product slot 112.

On the whole, therefore, the apparatuses and stations that require frequent intervention by the operator are positioned closer to the operating side, whereas those in which an intervention is rarely or never necessary are positioned farther away from the operating side.

The cartons K are fed from the erecting station 130 to the carton packing station 140 by a carton conveying apparatus 160. The conveying direction of the carton conveying apparatus 160 in this case is parallel to the first conveying direction. The carton conveying apparatus 160 conveys the cartons K onward to a carton closing station 170 and a carton turning station 175.

After this, the cartons K are taken by a Scara robot 182, which is positioned on a platform 181 of a palletizing station 180. The palletizing station 180 here is used to convey the cartons K onto pallets Z. For this purpose, a pallet feed 190 is provided, which feeds empty pallets Z to the palletizing station 180 and/or a pallet loading station 191.

Selected individual aspects of the present invention will be described in greater detail below. In this connection, the individual aspects, each taken on their own, can form the basis for claims (for example as part of a divisional application). The respective individual aspects can also all be combined with one another so that one, several, or all of the individual aspects of the packaging machines and/or methods contained can for the basis for claims.

On the one hand, the respective effects of the individual aspects considered individually each contribute to improvements with the individual aspects. On the other hand, several or all of the effects of the individual aspects considered together result in a by and large improved packaging machine, which while having a high throughput is space-saving at the same time.

Carton Magazine

In the following, aspects will be described that relate to the carton magazine 120 in particular. These can be combined with other individual aspects (such as the incorrect part discharge 114, the palletizing station 180, the labeling apparatus 150, or the stacking apparatus 111).

Figure 2:
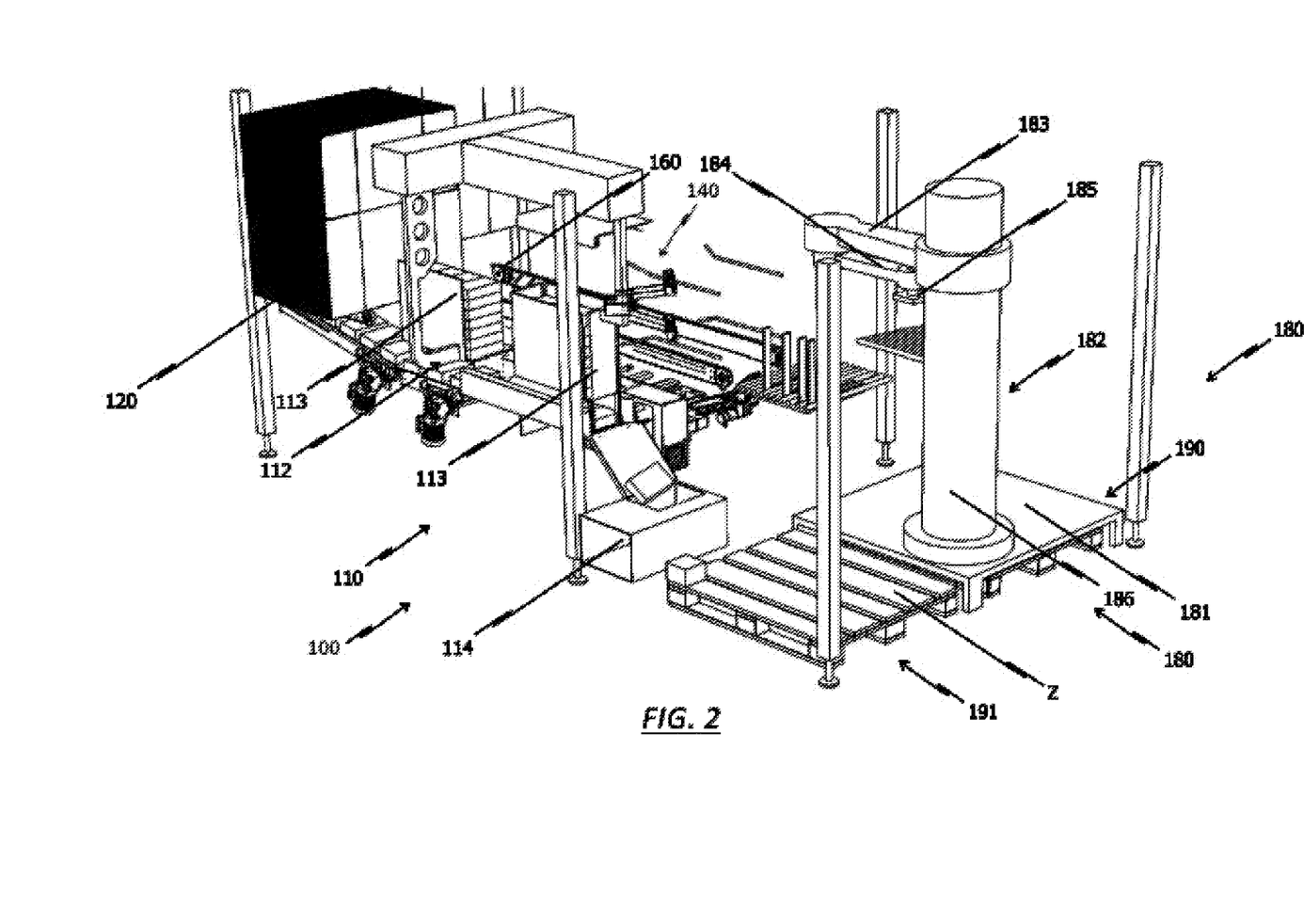
FIG. 2 shows another schematic top view of the packaging machine according to the present invention.
Figure 3:
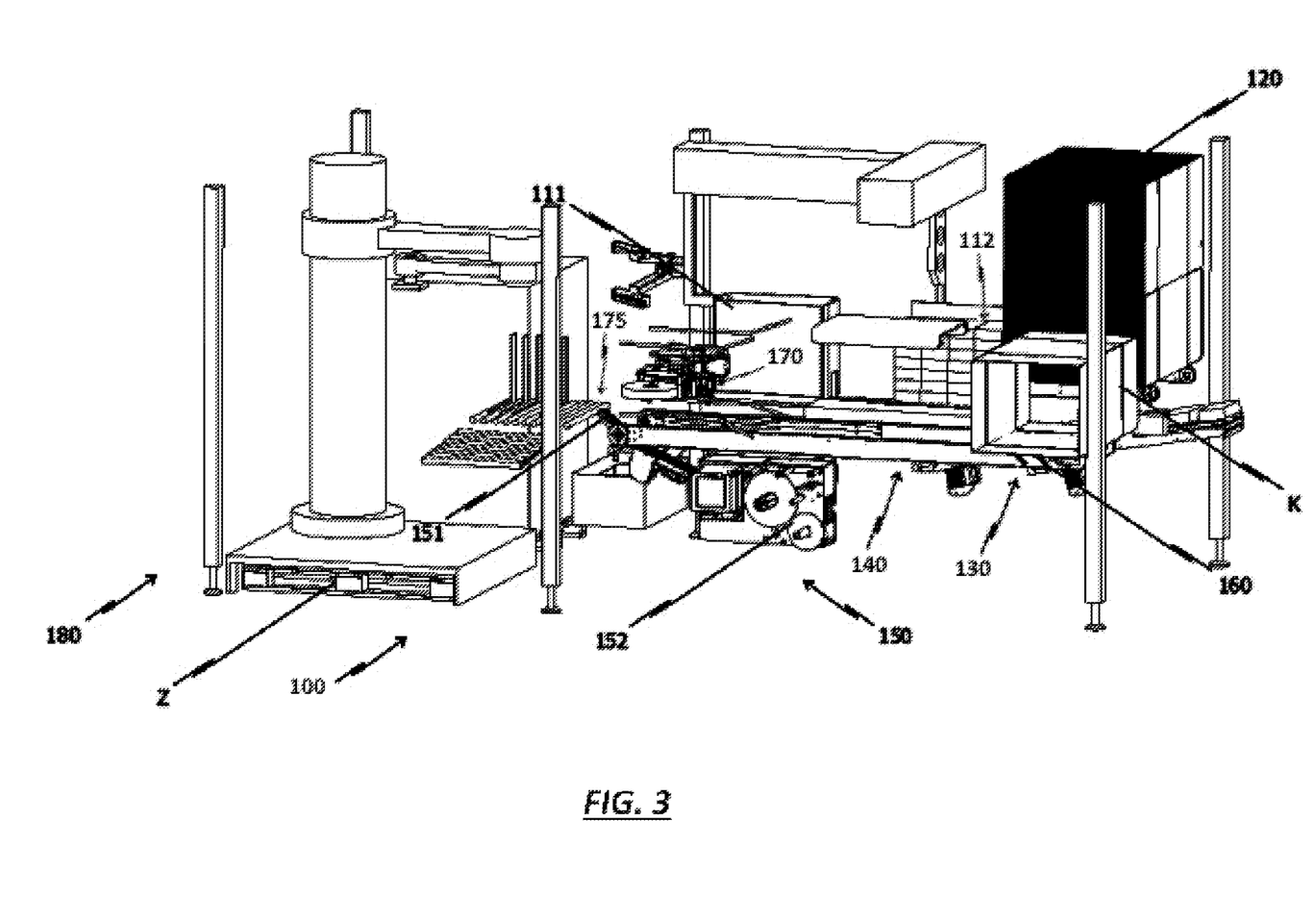
FIG. 3 shows another schematic top view of the packaging machine according to the present invention from a side opposite from the operating side.

As can be seen in FIGS. 1 to 3, the carton magazine 120 is positioned above the product feed 110. In this connection, carton blanks C are conveyed out of the carton magazine 120 perpendicular to the first conveying direction (and second conveying direction) of the product feed 110 away from an operating side to an erecting station 130. For example, the carton blanks C, which are preferably pre-glued, can be removed from the carton magazine 120 by means of a (suction) gripper.

In FIG. 1, partially hidden behind the carton magazine 120, a (pre-glued) carton blank C is shown, which is in a collapsed flat position in the erecting station 130. As is also visible, the carton blank C extends in a transverse direction (relative to the first conveying direction). The carton blank C has been taken from the carton magazine 130 in a transverse direction in which it was oriented upright, collapsed flat along with other carton blanks C next to one another in the first conveying direction.

In FIG. 2, the carton blank C has already been erected to form a carton K and is no longer visible from the operating side (is positioned hidden behind the erecting station 130). But the carton K is visible from the opposite side, which is shown in FIG. 3. There, the carton blank C is shown, which has been erected to form an at least substantially block-shaped open carton K in such a way that it can be filled with products O from the (at least substantially horizontal) transverse direction. To accomplish this, the carton conveying apparatus 160 conveys the carton K to the carton packing station 140.

The fact that the "carton feed direction" to the erecting station 130 is perpendicular to the "product feed direction" (first conveying direction) makes it possible to save space in the longitudinal direction of the packaging machine 100. In its position in the packaging machine 100, the carton magazine 120 (which is positioned closer to the operating side) is also easily accessible to an operator. The carton magazine 120 can thus be easily refilled.

Incorrect Part Discharge

As is particularly visible in FIGS. 1 and 2, an incorrect part discharge 114 is positioned at the end of the product feed 110. In this case, the incorrect part discharge 114 is positioned downstream of the stacking apparatus 111, viewed in the first conveying direction. For example, the incorrect part discharge 114 has a motion detector, which conveys the incorrect part to a chute, which in turn conveys the incorrect part into a receptacle.

The incorrect part discharge 114 is coupled and functionally connected to a monitoring device (not shown). In this connection, the monitoring device is used to detect incorrect parts, i.e. products that should not be packed. For example, the monitoring device can be an optical monitoring device such as a camera.

The monitoring device here is preferably positioned upstream of (i.e. before) the stacking apparatus 111 in the first conveying direction. In a particularly preferred embodiment, the monitoring device is positioned at the inlet of the stacking apparatus 111. Because the monitoring device and the incorrect part discharge 114 are placed at different positions in the flow direction, it is possible to ensure that there is enough processing time to detect incorrect parts and to appropriately trigger the incorrect part discharge 114.

In a particularly preferred embodiment, the incorrect part discharge 114 and the monitoring device are placed at the same position in the first conveying direction. This requires a correspondingly rapid data processing of the data recorded by the monitoring device.

Palletizing Station with Platform and Scara Robot

The next aspect particularly relates to the palletizing of cartons K onto pallets Z.

As can be seen in FIG. 2, the palletizing station 180 has a platform 181, which embodied in a bridge-like manner. The Scara robot 182 on the platform 181 and places cartons K or more generally stated, elements onto pallets Z. Because the platform 181 is positioned in a bridge-like manner, it is possible to store an empty pallet Z under the platform 181. When the pallet Z seen on the left in FIG. 2 is fully loaded, it is picked up by a (preferably automatic) forklift truck and the pallet feed 190 conveys an empty pallet Z, which has been temporarily stored under the platform 181, to the pallet loading station 191.

When the old pallet Z is conveyed away and the new pallet Z has not yet been placed at the ready in the pallet loading station 191 (during the pallet change), it is temporarily impossible for cartons K to be loaded onto pallets Z. The cartons K are temporarily stored on the platform 181 so that the preceding stations can continue to operate with their own cycle times and the palletizing station 180 does not cause a lengthening of the cycle time.

For this purpose, the Scara robot 182 is embodied with the ability to move in such a way that it is even able to set cartons K down in its immediate vicinity. The Scara robot 182 has a main body 186. The main body 186 has an upper arm 183 fastened to it, which is able to rotate around a first axis of rotation 183 (at a first end of the upper arm). The other end of the upper arm 183 has a first end of a lower arm 184 fastened to it, which is able to rotate around a second axis of rotation. The second end of the lower arm 184 has a hand 185 fastened to it, which is able to rotate around a third axis of rotation. The hand 185 is a grasping unit for cartons K. The three axes of rotation are oriented parallel to one another. In addition, the upper arm 183 is able to move vertically along the main body 186. Consequently, the Scara robot 182 as a whole is extremely mobile and has a large radius of action.

A distinctive feature at this point is the control of the Scara robot 182. The Scara robot 182 is embodied so that it can be actuated in such a way that the lower arm 184 travels under the upper arm 183. The lower arm 183 can therefore be rotated all the way around (360 degrees).

Labeling Apparatus

The next individual aspect relates to a labeling apparatus 150, which is provided to apply labels to cartons K.

As is particularly visible in FIG. 3, the labeling apparatus 150 is positioned under the carton conveying apparatus 160. In particular, the labeling apparatus 150 can be positioned underneath, in a region of the carton closing station 170 and/or of the carton turning station 175. The labeling apparatus 150 has a labeling guide 151 and a labeling magazine 152. The labeling guide 151 protrudes in the direction of the carton conveying apparatus 160 and reaches into the transport path traveled by a carton K.

The movement of the carton K through the carton conveying apparatus 160 results in the fact that the carton K comes into contact with the labeling apparatus 150 and in particular with the labeling guide 151. In so doing, it is possible to apply a label to the carton K. Depending on the orientation of the labeling guide 151, the label here can be applied to a front, to an underside, or to a front and underside (i.e. over the edge).

Stacking Apparatus and Product Slot

Another sub-aspect of the present invention will be described below, which relates in particular to increasing the throughput of the packaging machine 100.

The stacking apparatus 111 is embodied to stack a first group of products O, which are positioned next to one another in a row with a length R, vertically above a second group of products O, which are likewise positioned in a row with the length R. In this case, the products O themselves have the length P, viewed in the row direction. This also corresponds to the length (from front to back) of the products O in the first conveying direction.

The stacking apparatus 111 is the bottleneck of the packaging machine 100. It is thus desirable here for the largest possible quantity (the longest possible row of products O) to be stacked on top of one another. The stacking apparatus 111 is thus preferably always maximally loaded. From the stacking apparatus 111, the stacked cartons positioned in a row with the length R are conveyed to the product slot 112 (as can be seen in FIG. 2 by means of the product feeding slide 116).

From the product slot 112, a number of products O is slid into a carton K. In this connection, the number of products O inserted in a sliding procedure is less than the number of products O that are stacked on top of one another in a stacking procedure. In particular, the slide 113 has a length S, which is shorter than the length R. Stated simply, if the length S is shorter than the length R by one times the length P, then one stack of products O remains behind. Correspondingly, if the length S is shorter than the length R by two times the length P, then two stacks next to each other remain behind.

This is why the product slot 112 has a frontal area as a buffer zone in which the stacks of products O can remain behind. It is thus possible for the product slot 112 to operate at a faster rhythm than the stacking apparatus 111.

The principle should be explained by way of example below based on FIGS. 4 to 7. These figures are a schematic depiction of the operation, viewed from the operator side. In this case, the stacking apparatus 111 is positioned on the right and the product slot 112 is positioned on the left. The product feeding slide 116 is also still shown.

Figure 4:
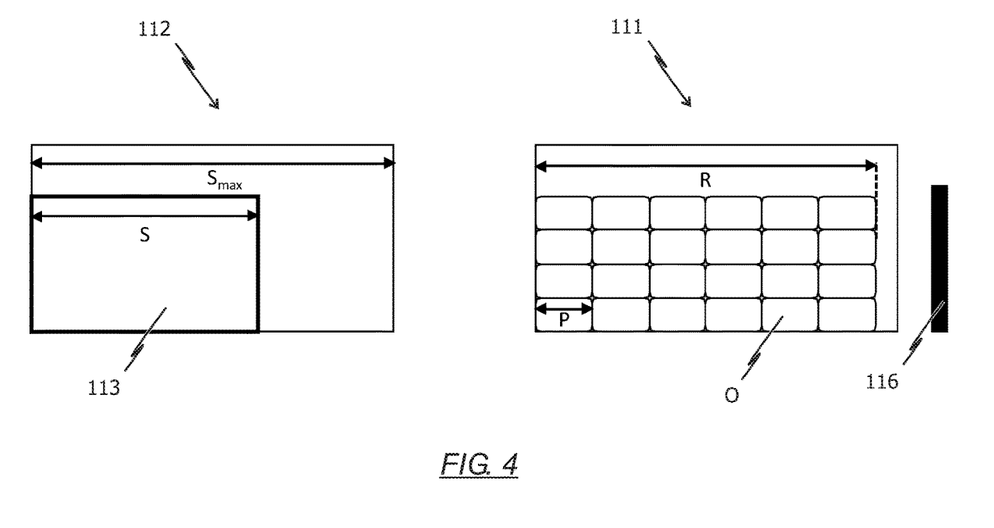
FIGS. 4 to 7 show schematic depictions of the procedure of sliding products into cartons according to the present invention.

FIG. 4 shows the slide 113 with its length S. There are no longer any products O in the product slot 112. The stacking apparatus 111 has supplied the first products O, or more precisely, six stacks of products O.

Figure 5:
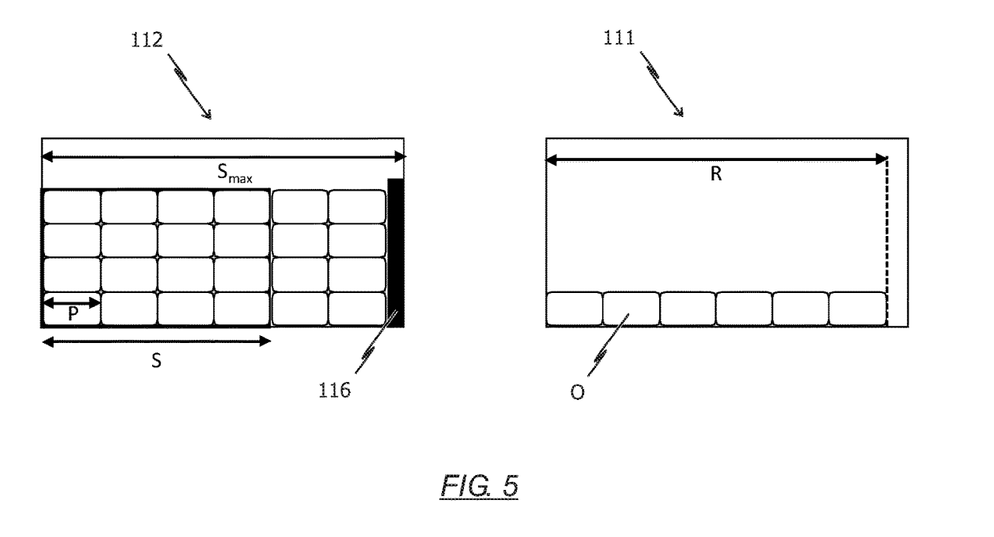

In FIG. 5, the product feeding slide 116 has already slid the products O into the product slot 112; only four stacks can then be slid onward by the slide 113.

Figure 6:
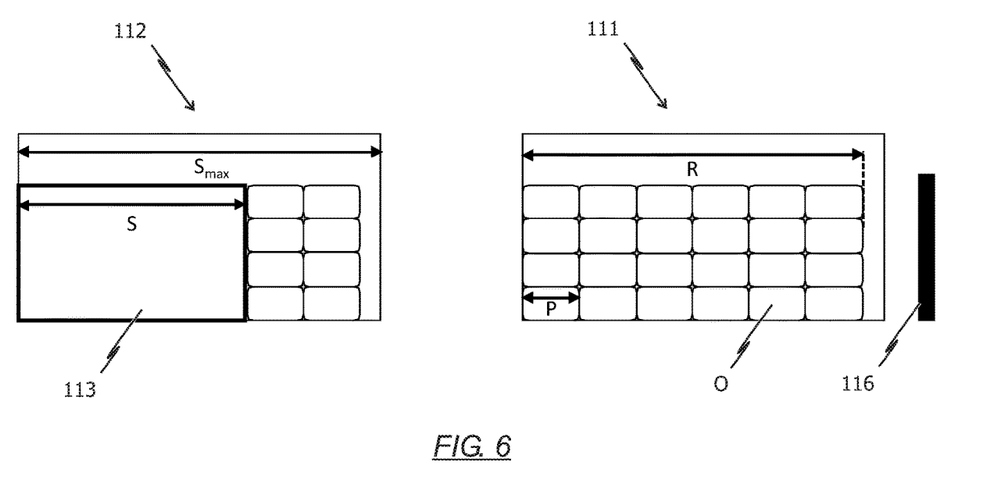

In FIG. 6, the slide 113 with the length S has already slid the four slidable stacks into the carton. Two stacks of products O remain behind as a remaining quantity in the frontal area of the product slot 112. In addition, the stacking apparatus 111 has once again supplied six stacks of products O.

Figure 7:
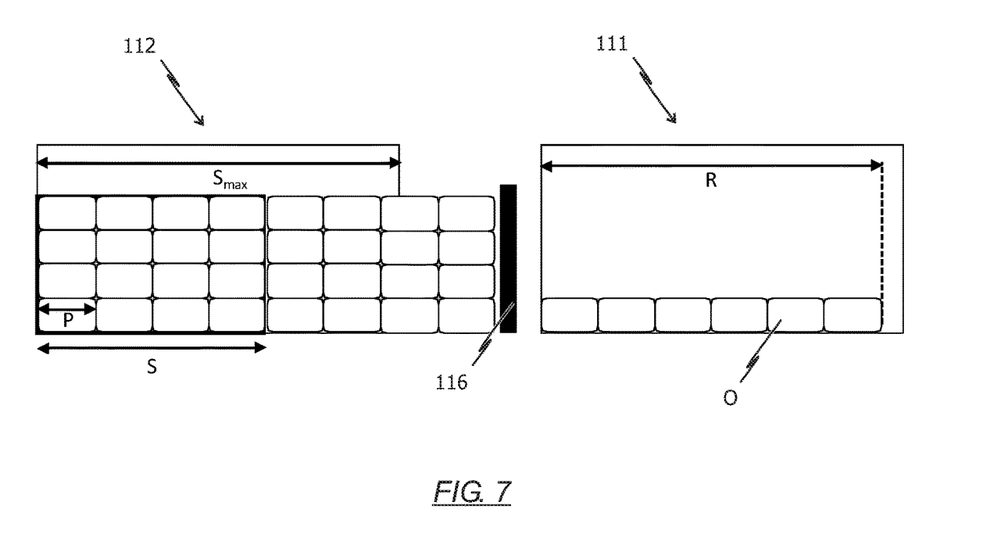

FIG. 7 shows how the product feeding slide 116 has moved the products O from the stacking apparatus 111 toward the product slot 112. Now, the slide 113 can convey the first four stacks into a carton K. Then the product feeding slide 116 can bring the remaining four stacks into position and the slide 113 can likewise convey them into the carton K. Here, the above-described sequence starts over again from the beginning (i.e. in FIG. 1).

It is thus possible to increase the throughput of the packaging machine 100 as a whole, i.e. the throughput is not limited by the stacking apparatus 111.

What is claimed is:

1. A packaging machine (100) for packaging products (O) in cartons (K), wherein the packaging machine (100) comprises:
   a product feed (110) for feeding products (O) to be packaged in the cartons (K);
   a carton magazine (120) in which a plurality of carton blanks are arranged collapsed at least substantially flat;

a stationary erecting station (130) for erecting the carton blanks to form at least substantially block-shaped open cartons (K), wherein the product feed (110) has an at least substantially horizontal first conveying direction, the erecting station (130) is positioned next to the carton magazine (120) in an at least substantially horizontal transverse direction perpendicular to the first conveying direction, and wherein the erecting station (130) is stationary at least in the horizontal transverse direction, whereby no movement of the cartons (K) along either of the horizontal first conveying direction or the horizontal transverse direction takes place within the stationary erecting station (130) during a carton erecting process;

wherein the carton magazine (120) is positioned above the product feed (110) in such a way that the product feed (110) guides the products (O) under the carton magazine (120), and the erecting station (130) is configured to erect the carton blanks at a height in the first conveying direction at which the carton magazine (120) is also positioned; and a carton packing station (140) for packing the cartons (K) with the products (O), wherein the carton packing station (140) is positioned downstream in the first conveying direction next to the erecting station (130), a product slot (112) is positioned at an end of the product feed (110), at which the product slot of a group of products (O) to be packaged is collected, and a slide (113) is positioned at the product slot (112), wherein the slide is embodied to slide the group of products (O) to be packaged in an at least substantially horizontal sliding direction into one of the cartons (K) at the carton packing station (140), and the sliding direction is at least substantially perpendicular to the first conveying direction.

2. The packaging machine (100) according to claim 1, wherein the packaging machine (100) also has an operating side, and wherein the carton magazine (120) is positioned on the operating side and the erecting station (130) is positioned behind the carton magazine (120) away from the operating side.

3. The packaging machine (100) according to claim 1, wherein the product feed (110) has a stacking apparatus (111) that is configured to at least stack a first group of products (O) vertically above or below a second group of products (O).

4. The packaging machine (100) according to claim 3, wherein the stacking apparatus (111) is also configured to convey the stacked groups of products (O) from a lower level to a vertically higher upper level.

5. The packaging machine (100) according to claim 3, wherein the products (O) are fed to the stacking apparatus (111) in the first conveying direction and conveyed onward from the stacking apparatus (111) in a second conveying direction, wherein the second conveying direction is substantially opposite from the first conveying direction.

6. The packaging machine (100) according to claim 1, wherein the packaging machine (100) also has a labeling apparatus (150) which is configured to provide each of the cartons (K) with a label from below.

7. The packaging machine (100) according to claim 1, further comprising a carton conveying apparatus (160) that is configured to transport the cartons (K) from the erecting station (130) to the carton packing station (140) and from the carton packing station (140) to a carton closing station (170) at which an open carton (K) is folded and/or glued to form a closed carton (K), wherein the conveying direction of the carton conveying apparatus (160) extends in the direction of the first conveying direction.

8. The packaging machine (100) according to claim 7, wherein a labeling apparatus (150) is positioned at least substantially below the carton conveying apparatus (160).

9. The packaging machine (100) according to claim 1, wherein the packaging machine (100) further comprises:

a palletizing station (180) that has a platform (181) and a Scara robot (182), which is positioned on the platform (181) and which is embodied to move the cartons (K) to be stowed on pallets (Z); and a pallet feed (190), which is embodied to feed empty pallets (Z) along a path, wherein the platform (181) is embodied in a bridge-like manner and the path extends under the platform (181) of the palletizing station (180).

10. The packaging machine (100) according to claim 9, wherein the platform (181) serves as an intermediate store for the cartons (K) to be stowed on the pallets (Z).

11. A method for packaging products (O) in cartons (K) with the aid of a packaging machine (100) according to claim 1.

\* \* \* \* \*